United States Patent
Holt, Jr.

(10) Patent No.: US 11,484,010 B2
(45) Date of Patent: Nov. 1, 2022

(54) PRONG TRAINING COLLAR

(71) Applicant: COASTAL PET PRODUCTS, INC., Alliance, OH (US)

(72) Inventor: Robert C. Holt, Jr., North Canton, OH (US)

(73) Assignee: COASTAL PET PRODUCTS, INC., Alliance, OH (US)

( * ) Notice: Subject to any disclaimer, the term of this patent is extended or adjusted under 35 U.S.C. 154(b) by 204 days.

(21) Appl. No.: 16/838,335

(22) Filed: Apr. 2, 2020

(65) Prior Publication Data

US 2021/0307292 A1 Oct. 7, 2021

(51) Int. Cl.
*A01K 15/02* (2006.01)
*A01K 27/00* (2006.01)

(52) U.S. Cl.
CPC ............ *A01K 15/02* (2013.01); *A01K 27/001* (2013.01)

(58) Field of Classification Search
CPC .... A01K 15/02; A01K 27/001; A01K 27/005; A01K 27/00
See application file for complete search history.

(56) References Cited

U.S. PATENT DOCUMENTS

| | | | | |
|---|---|---|---|---|
| 2,394,144 A | * | 2/1946 | Brose | A01K 15/02 119/862 |
| 2,614,533 A | * | 10/1952 | Elsinger | A01K 27/001 119/864 |
| 4,924,815 A | * | 5/1990 | Halla | A01K 27/001 119/864 |
| 5,647,303 A | * | 7/1997 | Deioma | A01K 27/001 119/864 |
| 6,606,967 B1 | | 8/2003 | Wolfe, Jr. et al. | |
| 6,938,580 B2 | * | 9/2005 | Herbst | A01K 27/001 119/864 |
| 8,356,579 B2 | | 1/2013 | Sullivan | |
| 9,326,489 B2 | | 5/2016 | Ritzdorf | |
| 11,129,366 B2 | * | 9/2021 | Benjamin | A01K 27/001 |
| 2005/0045116 A1 | * | 3/2005 | Clute | A01K 27/001 119/864 |
| 2009/0235874 A1 | * | 9/2009 | Sullivan | A01K 27/001 119/864 |
| 2012/0192811 A1 | * | 8/2012 | Robinson | A01K 27/001 119/862 |
| 2014/0366814 A1 | * | 12/2014 | Ritzdorf | A01K 27/001 119/856 |
| 2017/0295754 A1 | * | 10/2017 | Hiers | A01K 27/001 |
| 2021/0137076 A1 | * | 5/2021 | Benjamin | A01K 27/001 |

FOREIGN PATENT DOCUMENTS

EP     3542623 A1 *  9/2019  ........... A01K 27/001

* cited by examiner

*Primary Examiner* — Trinh T Nguyen
(74) *Attorney, Agent, or Firm* — Renner, Kenner, Greive, Bobak, Taylor & Weber

(57) ABSTRACT

The present invention provides a dog collar comprising: a first strap, a plurality of prong elements carried by the first strap, a second strap, and two cam buckles secured to the second strap. The first strap is secureably connected to the second strap through the two cam buckles.

7 Claims, 5 Drawing Sheets

PRONG TRAINING COLLAR

FIELD OF THE INVENTION

The present invention relates to prong animal training collars. More particularly the present invention relates to a prong animal training collar wherein the prongs are made from plastic. Most particularly the present invention relates to a plastic prong animal training collar wherein the prongs are carried on a nylon webbing.

BACKGROUND OF THE INVENTION

Collars serve many useful purposes. By way of example, but not by limitation, collars have proved useful in animal control, training, and behavior modification. The prior art discloses many varieties of "training" collars. Typical of the prior art is the Swanson et al. patent (U.S. Pat. No. 5,317,989) which discloses a simple collar including a first flat strap member and a second control loop. There have been numerous types of collars sold as training devices for dogs, yet few have proven to effectively create lasting change in the dog's behavior. Many collars of late have focused on a passive approach to training that in essence is void of any true corrective qualities.

Other "training" type collars include projections of one sort or another designed to provide pressure to the animal so as to assist in controlling and training the animal. The Schneider patent (U.S. Pat. No. 441,706) discloses the use of spring loaded "clutch-fingers". The Deioma patent (U.S. Pat. No. 5,647,303) discloses a constrictive collar made up of multiple flexible members with each flexible member including "fingers" for assisting in animal control.

There are other variations of control collars known in the art. The Davies-Ross patent (U.S. Pat. No. 6,101,980) discloses a collar with a series of prongs or posts arranged to contact the throat of the animal that are embedded in a compressible, resilient material so that when the leash is not pulling, the prongs are recessed within the compressible, resilient material.

A problem with the prior art collars is that there is no middle ground. That is, with the prior art collars, the collar will either have the spring-loaded prongs or not, for example. Collars with prongs are useful, but do not allow for covering the entire range of animal control from highly aversive collars with prongs to non-aversive collars with very few prongs. Additionally, prior art collars are not easily adjustable nor do they provide for an attractive exterior surface capable of decoration.

Furthermore, there is a drawback of a prominent social stigma to being seen using a pinch collar and even a standard metal choke chain. Most people will comment that the Pinch collar looks like a medieval torture device. It is these knee-jerk reactions to the visual appearance of the pinch collar that will cause many people not to ever try the collar on their dog for training purposes.

There have been attempts to improve upon the traditional metal Pinch collar, by way of example, a collar formed from a plurality of interconnecting collar elements having substantially plastic components. While fit for its intended purpose and while addressing some of the drawbacks to a traditional pinch collar, such a collar does not address all of the drawbacks. For example, and not by way of limitation, such a collar does not address the issue of twisting the collar when putting the collar on the dog. Furthermore, such a collar relies upon routine engagement and disengagement of the interconnecting elements for putting on and taking off of a dog's neck. The result is that unnecessary wear of plastic portions of the interconnected portion of the elements may occur from extended use over time. Furthermore, some people may experience confusion and difficulty when attempting the interconnecting of elements while the collar is around a dog's neck, particularly if the dog is at an early stage of training, given the snug fit required for proper use and that the dog may resist application of the collar to its neck by shaking its head and trying to pull away. Finally, a collar with interconnected collar elements is not going to be flexible, making it harder to work with and less comfortable for the animal.

Thus, the need exists for a collar that address all of the drawbacks of a traditional Pinch collar and collars formed from a plurality of interconnected collar elements, that is easy to attach to a dog's neck, that is easy to assemble and connect, and that has an attractive outward appearance.

SUMMARY OF THE INVENTION

In a first embodiment, the present invention provides a dog collar comprising: a first strap, a plurality of prong elements carried by the first strap, a second strap, and two cam buckles secured to said second strap, wherein the first strap is secureably connected to said second strap through the two cam buckles.

In a second embodiment, the present invention provides a dog collar as in any embodiment above, wherein said second strap includes a first end and a second end.

In a third embodiment, the present invention provides a dog collar as in any of the two embodiments above, further comprising a female end of a conventional quick release coupler proximate said first end of said second strap and a male end of a conventional quick release couple proximate said second end of said second strap.

In a fourth embodiment, the present invention provides a dog collar as in any of the three embodiments above, further comprising a leash connector proximate either said first end or second end of said second strap.

In a fifth embodiment, the present invention provides a dog collar as in any of the four embodiments above, wherein said first strap is formed of one continuous piece of material, and wherein the material is selected from the group consisting of nylon or leather.

In a sixth embodiment, the present invention provides a dog collar as in any of the five embodiments above, wherein said second strap is formed of one continuous piece of material, and wherein the material is selected from the group consisting of nylon or leather.

In a seventh embodiment, the present invention provides a dog collar as in any of the six embodiments above, wherein each prong element of said plurality of prong elements includes a body, wherein said body includes a least one protrusion and a strap channel located along a bottom portion of the prong element.

In an eighth embodiment, the present invention provides a dog collar as in any of the seven embodiments above, wherein each prong element includes two protrusions.

In a ninth embodiment, the present invention provides a dog collar as in any of the eight embodiments above, wherein each prong element further includes a bridging element connecting the two protrusions and wherein the prong element further includes an overlapping strap channel located between said bridging element and said bottom portion of the prong element.

In a tenth embodiment, the present invention provides a dog collar as in any of the nine embodiments above, wherein the plurality of prong elements are carried by said first strap being directed through each strap channel of each prong element until each prong element of the plurality of prong elements are carried by said first strap, and then a first end of the first strap is secured in a first of the two cam buckles and a second end of the first strap is secured in a second of the two cam buckles.

In an eleventh embodiment, the present invention provides a prong collar element comprising: a prong body member; at least one protrusion member; and a strap channel located along a bottom portion of the body member.

In a twelfth embodiment, the present invention provides a prong collar element as in any of the prong collar elements above, further comprising two protrusion members and a bridging element connecting the two protrusions members.

In a thirteenth embodiment, the present invention provides a prong collar element as in any of the prong collar elements above, further comprising a first strap channel opening and a second strap channel opening, and an overlapping strap channel located between said bridging element and said bottom portion of the body member.

DETAILED DESCRIPTION OF ILLUSTRATIVE EMBODIMENTS

Figure 1:
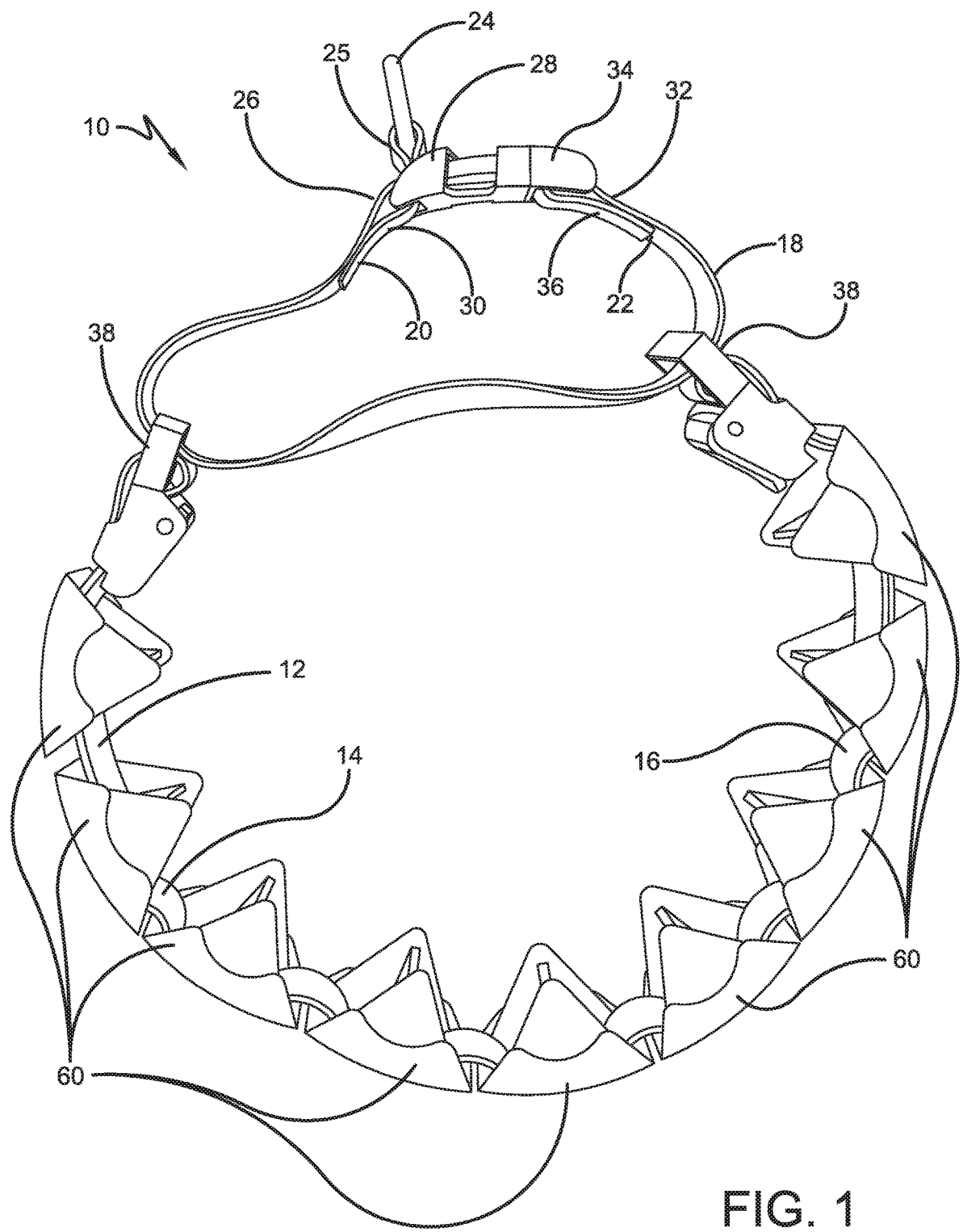
FIG. 1 is a perspective view of an embodiment of the prong training collar of the present invention.

A collar for a pet is generally indicated by the numeral 10. Collar 10 includes a first strap 12 which is preferably formed of one continuous piece of material, such as nylon, leather, or the like, having a first end 14 and a second end 16 as best shown in FIG. 1. Collar 10 also include a second strap 18, which can also be referred to as martingale strap 18, which is also preferably formed of one continuous piece of material, such as nylon, leather, or the like, having a first end 20 and a second end 22 as best shown in FIG. 1. Second strap 18 extends from first end 20, around a post 26 of a female end 28 of a conventional quick release coupler and is then wound threw a leash connector 24. Once wound around leash connector 24, second strap 18 is stitched or otherwise attached to itself, as at securement area 25. Second strap 18 is also stitched or otherwise attached to itself at a securement area 30, adjacent to first end 20.

Second strap 18 then continues past securement area 25 and continues around a post 32 of a male end 34 of a conventional quick release coupler and second strap 18 ends at second end 22. Second strap is then again stitched or otherwise attached to itself at a securement area 36, adjacent to second end 22. However, prior to second strap 18 continuing around post 30 and eventually being stitched at securement area 36, two cam buckles 38 are attached to second strap 18 such that once second strap 18 is stitched at 36, the two cam buckles 38 are secured onto second strap 18.

Figure 2A:
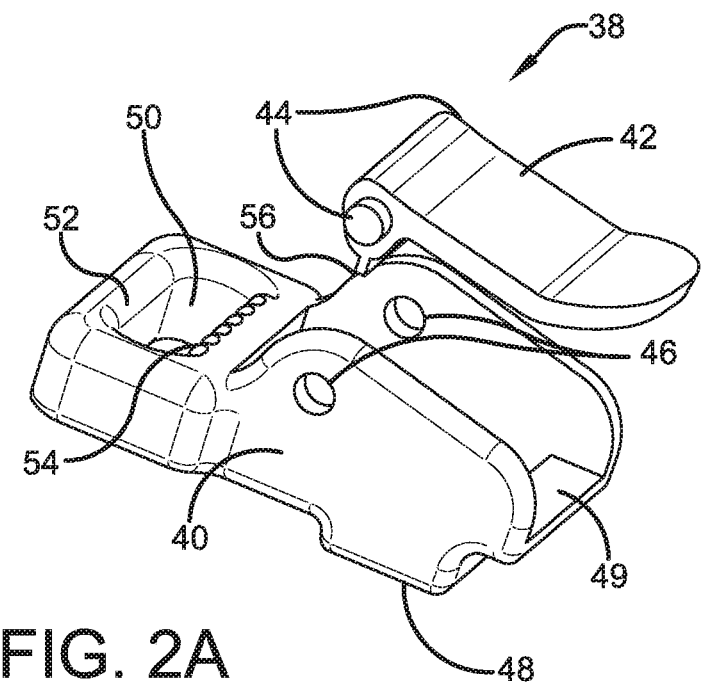
FIG. 2A is a perspective view of a cam buckle of the present invention prior to the lever member of the cam buckle being secured to the body member of the cam buckle.
Figure 2B:
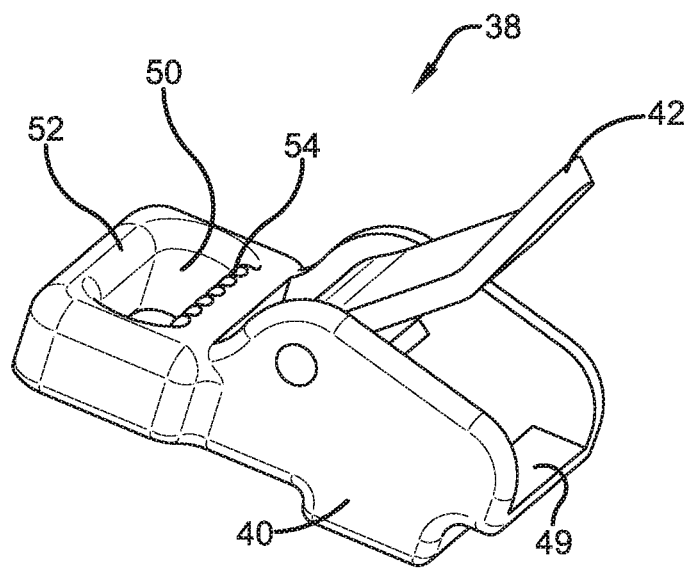
FIG. 2B is a perspective view of the cam buckle of FIG. 2A with the lever member secured to the body member.
Figure 2C:
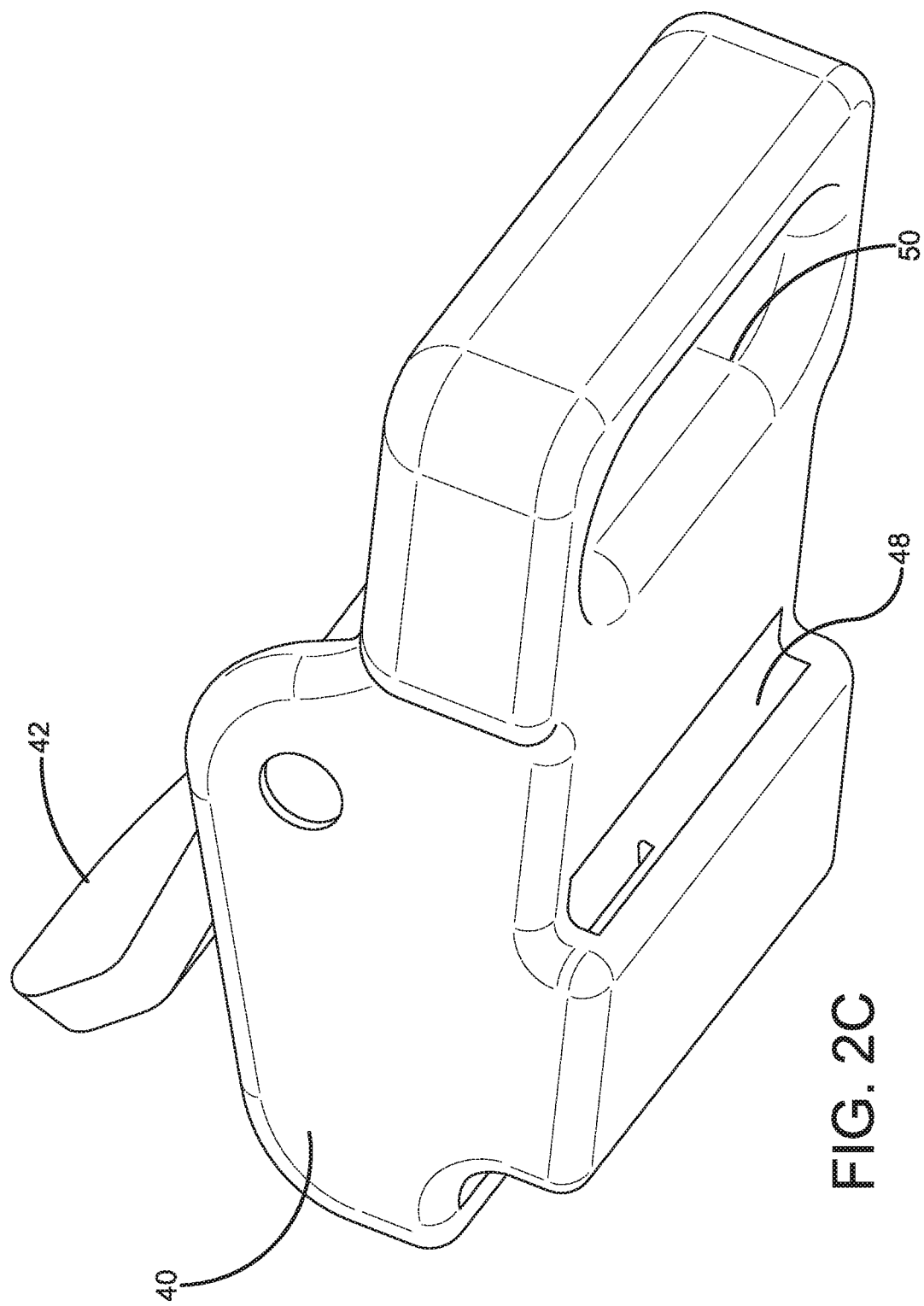
FIG. 2C is a perspective view of the underside of the cam buckle of FIG. 2A.

FIGS. 2A, 2B, and 2C each show a cam buckle 38 not secured to second strap 18. Each cam buckle 38 includes a body member 40 and a lever member 42. Lever member 42 is pivotably secured to body member 40 by knob portions 44 of lever member 42 being securely placed into pivot apertures 46 of the body member 40. Body member 40 also includes a strap channel 48, a strap bar 49 and a strap aperture 50. Strap aperture 50 includes an end 52 that does not contain serrations and an end 54 that does contain serrations. Lever member 42 additionally includes a gripping post 56.

Figure 3A:
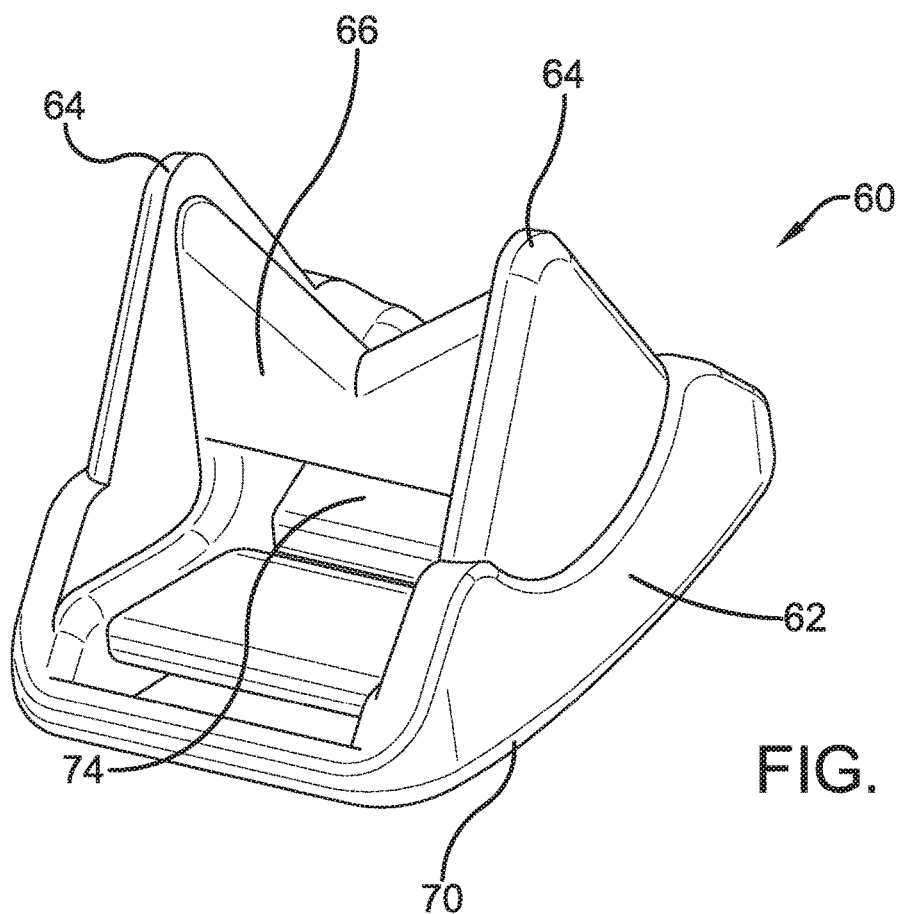
FIG. 3A is a perspective view of a prong element of the present invention.
Figure 3B:
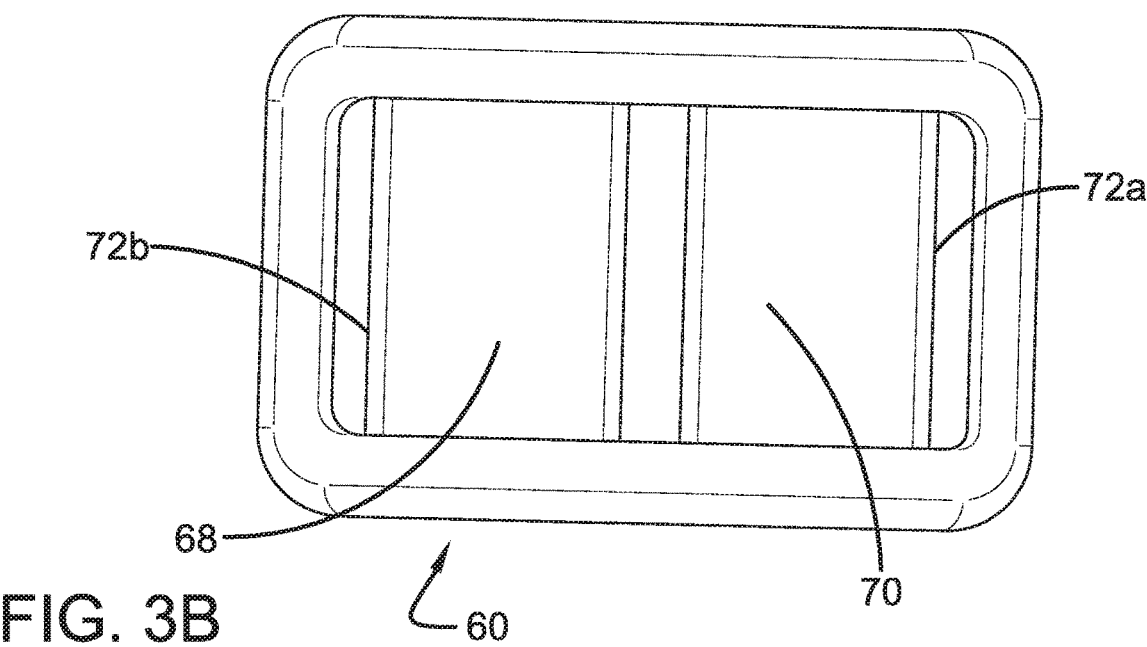
FIG. 3B is a perspective view of the underside of the prong element of FIG. 3A.

Carried on the first strap 12 is a plurality of prong elements 60. FIGS. 3A and 3B each show a prong element not being carried by first strap 12. Prong element 60 includes a body 62 having protrusions 64. In one or more embodiments, protrusions 64 are connected to one another by a bridging element 66. Prong element 60 also includes a strap channel 68 located along a bottom portion 70 of prong element 60 having a first channel opening 72a and a second channel opening 72b as well as an overlapping strap channel 74 located between bridging element 66 and bottom portion 70 of prong element 60. Bridging element 66 strengthens the protrusions 64 while also providing a means to form the overlapping strap channel 74.

To place the plurality of prong elements 60 onto first strap 12, the first end 14 of strap 12 is directed through a first channel opening 72a of a prong element 60, across strap channel 68, and then out through second channel opening 72b such that first strap 12 is located on the bottom portion 70 of a prong element 60. This process is repeated for every prong element of the plurality of prong elements 60. Once the plurality of prong elements 60 are placed onto first strap 12, the first end 14 of first strap 12 is secured to one of the two cam buckles 38 and then the second end 16 of first strap 12 is secured to the other of the two cam buckles 38.

To secure the first strap to the two cam buckles 38 there should be enough room on both the first end 14 and the second end 16 of strap 12 that is free of prong elements 60. Then, the first end 14 of strap 12 is directed through strap channel 48, up through strap aperture 50 such that strap 12 lies flush against end 54 that does contain serrations, back under lever member 42 past the gripping post 56, and then under strap bar 49 back through strap channel 48. Once back through strap channel 48, strap 12 is pulled tight, and then lever member 42 is pivoted downward such that gripping post 56 is brought down flush against strap 12 to grip strap 12 into a secure position. Then, any remaining portion of strap 12 proximate to the first end 14 can be directed through the overlapping strap channel(s) of as many prong elements 60 as necessary to secure first end 14 of strap 12. The exact same sequence can then be undertaken to direct the second end 16 of strap 12 through the other cam buckle 38.

Figure 4:
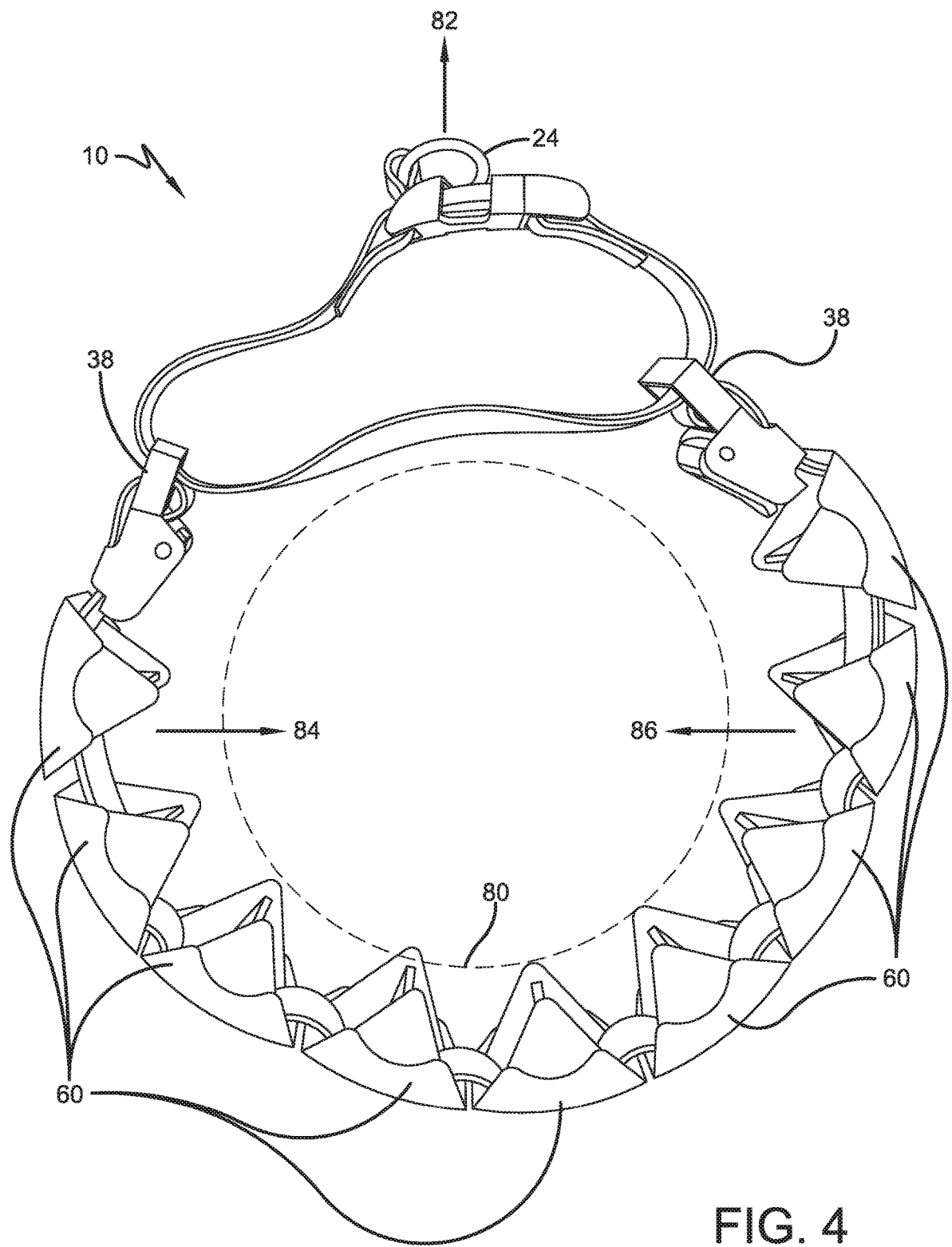
FIG. 4 is a schematic illustrating the functioning of the prong training collar of the present invention when utilized around the neck of an animal when the prong training collar is used with a leash

Referring now to FIG. 4, the normal use and function of the prong training collar 10 of the present invention as an animal training collar is illustrated. As shown, a plurality of prong elements 60 and the two cam buckles 38 have been secured to the first strap 12 as previously described. The dashed circle 80 represents the neck of the animal being trained. In operation, when a leash (not shown) attached to leash connector 24 is pulled in the direction of arrow 82, the cam buckles 38 are drawn together in the direction of arrows 84 and 86. This results in the application of pressure to the neck of the animal being trained and a pinching action by the protrusions 64 of the prong elements 60. Furthermore, due to the ability for the prong elements 60 to be easily placed and removed onto first strap 12, the number of prong element 60 carried on first strap 12 can be varied. The number of prong elements 60 can be varied based on the size of the neck of the animal to be trained. When collar 10 is on an animal and the animal is not "pulling" then the prong elements 60 will be in a relaxed state. However, when an animal pulls, this will result in pressure to the neck of the animal by the protrusions 64 of the prong elements 60.

In light of the foregoing, it should be appreciated that the present invention significantly advances the art by providing a prong training collar that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A dog collar comprising:
   a. a first strap;
   b. a plurality of prong elements, wherein each prong element of said plurality of prong elements includes a body, wherein said body includes a least one protrusion and a strap channel located along a bottom portion of the prong element, and wherein said first strap is looped through each said strap channel;
   c. a second strap; and
   d. two cam buckles carried by said second strap,
wherein said first strap is securably connected to said second strap through the two cam buckles, wherein said second strap includes a first end and a second end, and wherein the dog collar further includes a female end of a conventional quick release coupler secured proximate said first end of said second strap and a male end of a conventional quick release couple secured proximate said second end of said second strap.

2. The dog collar of claim 1 further comprising a leash connector proximate either said first end or second end of said second strap.

3. The dog collar of claim 1, wherein said first strap is formed of one continuous piece of material, and wherein the material is selected from the group consisting of nylon or leather.

4. The dog collar of claim 1, wherein said second strap is formed of one continuous piece of material, and wherein the material is selected from the group consisting of nylon or leather.

5. The dog collar of claim 1, wherein each prong element includes two protrusions.

6. A dog collar comprising:
   a. a first strap;
   b. a plurality of prong elements secured to said first strap;
   c. a second strap; and
   d. two cam buckles carried by said second strap,
wherein said first strap is securably connected to said second strap through the two cam buckles, wherein each prong element of said plurality of prong elements includes a body, wherein said body includes two protrusions and a strap channel located along a bottom portion of the prong element, wherein each prong element further includes a bridging element connecting the two protrusions and wherein the prong element further includes an overlapping strap channel located between said bridging element and said bottom portion of the prong element.

7. The dog collar of claim 6, wherein the plurality of prong elements are carried by said first strap being directed through each strap channel of each prong element until each prong element of the plurality of prong elements are carried by said first strap, and then a first end of the first strap is secured in a first of the two cam buckles and a second end of the first strap is secured in a second of the two cam buckles.

\* \* \* \* \*